United States Patent [19]

Minissale et al.

[11] Patent Number: 5,777,563
[45] Date of Patent: Jul. 7, 1998

[54] METHOD AND ASSEMBLY FOR OBJECT DETECTION BY A VEHICLE

[75] Inventors: Ernest P. Minissale, Livonia; Tova Fry, Detroit; Wilbur J. Hull, III, Grand Blanc, all of Mich.

[73] Assignee: Chrysler Corporation, Auburn Hills, Mich.

[21] Appl. No.: 541,548

[22] Filed: Oct. 10, 1995

[51] Int. Cl.[6] .................................................. G08G 1/16
[52] U.S. Cl. .......................... 340/903; 367/909; 701/301; 340/435
[58] Field of Search ..................... 340/435, 903, 340/463, 468; 364/461; 367/909, 99; 180/169; 701/301

[56] References Cited

U.S. PATENT DOCUMENTS

| | | | |
|---|---|---|---|
| 4,641,136 | 2/1987 | Kowalczyk | 340/435 |
| 5,087,918 | 2/1992 | May et al. | 340/435 |
| 5,235,315 | 8/1993 | Qualizza | 340/435 |
| 5,249,128 | 9/1993 | Markandey et al. | 364/426.4 |
| 5,291,261 | 3/1994 | Dahl et al. | 356/1 |
| 5,307,136 | 4/1994 | Saneyoshi | 356/1 |
| 5,347,273 | 9/1994 | Katiraie | 340/435 |
| 5,430,450 | 7/1995 | Holmes | 342/69 |
| 5,572,484 | 11/1996 | Gaus et al. | 340/435 |
| 5,574,443 | 11/1996 | Hsieh | 340/435 |
| 5,594,413 | 1/1997 | Cho et al. | 340/435 |

*Primary Examiner*—Brent A. Swarthout
*Attorney, Agent, or Firm*—Jennifer M. Stec

[57] ABSTRACT

An object detection assembly and method use at least one sensor to detect a signal indicating the presence and location of an object relative to an automotive vehicle. A receiver receives a location signal created by a transmitter. A control unit receives the location signal and identifies the presence and degree of closeness of the object by activating audible and visual indicators. The control unit operates a parameter definer to identify the spatial parameters within which a warning of the existence of the object is to be activated. The control unit receives signals of vehicle speed and transmission state to determine the spatial parameters.

5 Claims, 6 Drawing Sheets

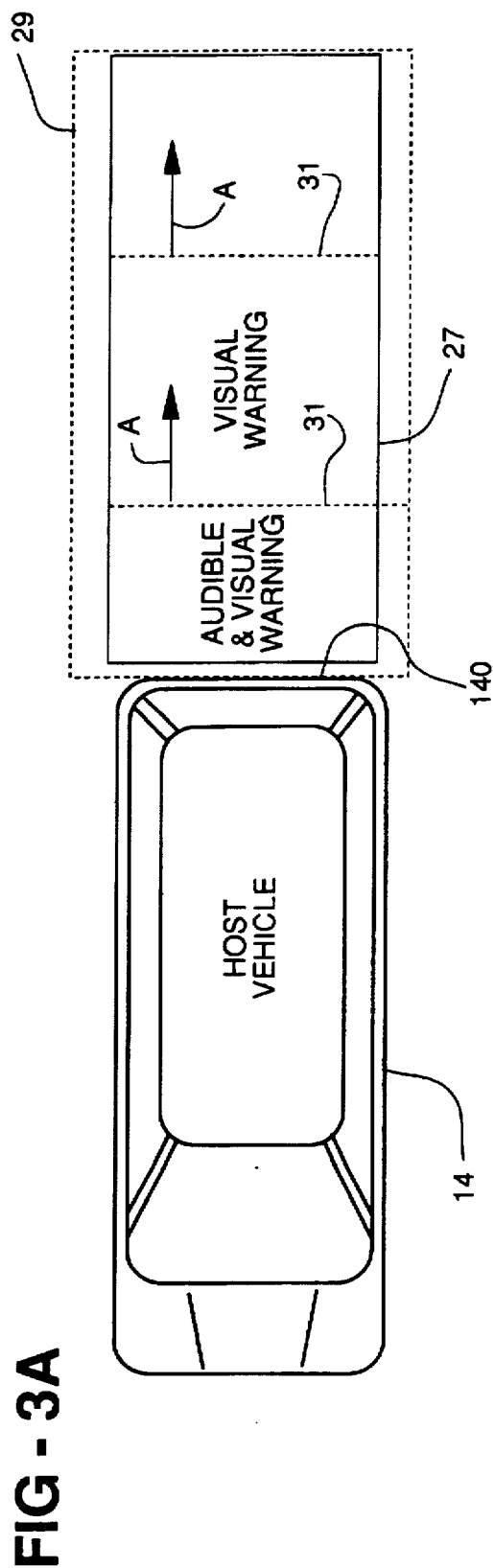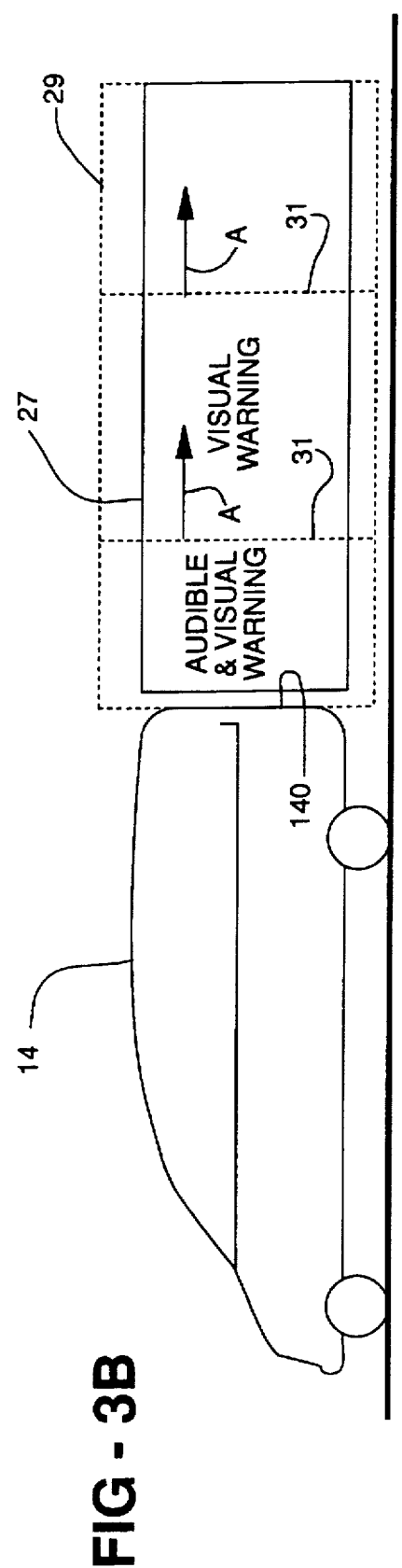

EVENT RECORDER SUBROUTINE

METHOD AND ASSEMBLY FOR OBJECT DETECTION BY A VEHICLE

BACKGROUND OF THE INVENTION

1. Field of the Invention

The invention relates to object detection. More particularly, the invention relates to the detection of objects in a space adjacent an automotive vehicle.

2. Description of Related Art

The detection of objects around a vehicle is an ever growing concern, especially with the increased popularity of the larger vehicles, i.e., trucks, vans, minivans, and the like. Attempts have been made to provide added protection against collisions with other objects. One such system is disclosed in U.S. Pat. No. 5,307,136, issued to Saneyoshi on Apr. 26, 1994. The system disclosed is an optical system wherein a plurality of optical cameras receive information and, based on the receiving angles, they calculate the distance of an object at which the camera is aimed. This system is not, however, capable of adapting the range in which the detection of objects may occur based on the speed and/or the gear selection of the transmission. More specifically, the range in which the detection system works is static and fails to take into account the reaction time of the person operating the automotive vehicle given the power being received by the transmission, if any, and the current speed of the automotive vehicle.

SUMMARY OF THE INVENTION

Accordingly, an object detection assembly detects an object having a location in spaced relation to an automotive vehicle. The object detection assembly includes a receiver for receiving a location signal identifying the location of the object. A parameter definer is operatively connected to the receiver. The parameter definer sets the spatial parameters around the automotive vehicle. An indicator is operatively connected to the parameter definer. The indicator produces a warning signal when the location of the object is within the spatial parameters. A control unit is operatively connected between the receiver, the parameter definer, and the indicator. The control unit includes at least one sensor input port for receiving vehicle data. The control unit uses data from the sensor to change the spatial parameters defined by the parameter definer based on the data received by the vehicle data input port.

An advantage associated with the invention is the ability of the object detection assembly to modify the spatial parameters in which the object detection assembly detects objects. Another advantage of the invention is the ability of the object detection assembly to modify the spatial parameters based on the outputs of the automotive vehicle, namely the speed of the automotive vehicle and the gear selection of the transmission of the automotive vehicle.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3A is top view of a vehicle and a schematic drawing of the spatial parameters;

FIG. 3B is a side view of the vehicle with a schematic drawing of the spatial parameters;

DETAILED DESCRIPTION OF THE PREFERRED EMBODIMENTS

Figure 1:
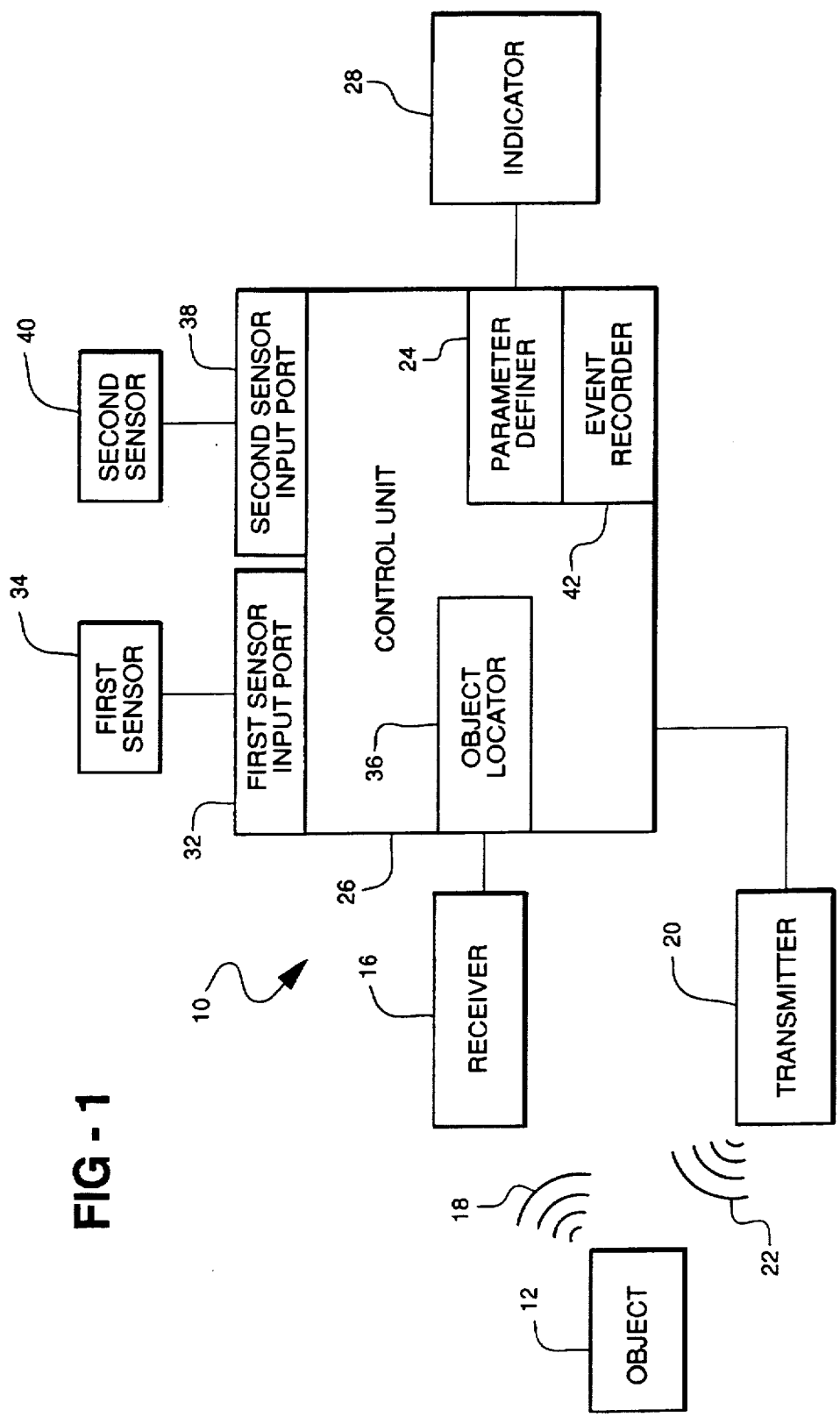
FIG. 1 is a block diagram of an embodiment of the invention.

Referring to FIG. 1, one embodiment of the invention is generally indicated at 10. The invention 10 is an object detection assembly and is used to detect an object 12 having a location in spaced relation with an automotive vehicle 14 (best shown in FIGS. 3A and 3B). Although the object detection assembly 10 is shown to be detecting objects rearward of the automotive vehicle 14, it may be appreciated by those skilled in the art that the object detection assembly 10 may detect objects in any direction relative to the automotive vehicle 14.

A receiver 16 receives a location signal, graphically shown at 18 in FIG. 1, identifying the location of the object 12. The receiver 16 may be any type of device capable of receiving signals from an object 12. A non-exhaustive list of receivers include infrared receivers, optical receivers, radio frequency receivers, and the like. In the preferred embodiment, the receiver 16 receives radar signals which are transmitted by a transmitter 20 and reflected off the object 12 to create the location signal 18. The transmitter 20 transmits the radar signals 22 and, in one embodiment, in a direction in which the automotive vehicle 14 is moving. The radar signals may incorporate various signal modification techniques, i.e., Doppler principles and the like, to more accurately locate the object 12. It may be apparent by those skilled in the art that the transmitter 20 and the receiver 16 may be combined in a transceiver (shown in FIG. 2) wherein such a combination is a mere design choice.

A parameter definer 24 is operatively connected to the receiver 16 and is a part of a control unit 26, discussed subsequently. The parameter definer 24 sets the spatial parameters 27 around the automotive vehicle 14 within which an indicator 28, discussed subsequently, will be activated. Turning our attention to FIGS. 3A and 3B, the spatial parameters 27 are graphically shown rearward of the automotive vehicle 14. The parameter definer 24 also defines outer limit parameters 29 which define a second set of parameters beyond which the object 12 will not be detected. These spatial parameters 26 will be discussed in more detail subsequently.

The indicator 28 is operatively connected to the parameter definer 24, through the control unit 26. The indicator 28 produces a warning signal when the location of the object 12 is within or is about to be within the spatial parameters 26. The indicator 28 may produce a warning signal which is either visible, audible, or any combination thereof. In the preferred embodiment, a visual warning precedes an audible and visual warning combination. In one embodiment, the visual indicator is a blinking lamp wherein the frequency of blinking increases as the object 12 nears the automotive vehicle 14. Distances 31 defining at which point each type of warning is activated extend outwardly in the direction of arrow A as the speed of the automotive vehicle 14 increases. If the automotive vehicle 14 is moving fast enough, the visual warning will be accompanied by an audible signal at the outset, i.e., the audible and visual warning space will be the total area within the spatial parameters 27.

The indicator 28 will be located inside the passenger compartment of the automotive vehicle 14. In one embodiment, at least a portion of the visual portion of the indicator 28 must be located by or near the rear window (not shown) of the automotive vehicle 14. Light emitting diodes (LEDs) may be used as an alternative to lamps or bulbs. The LEDs, or other light source, are mounted and displayed on or near the rear window. Alternatively, bulbs may be used. The indicator 28 may provide visual warning signals at a plurality of locations inside the passenger compartment to ensure the operator of the automotive vehicle 14 is cognizant of those warning signals. The audible signal may be generated from any type of sound generator and may be located anywhere within the passenger compartment of the automotive vehicle 14. A sound generating circuit (not shown) may be utilized separately or in combination with the LEDs as the indicator 28 to mute a radio system wherein a sound generator (not shown) may produce a tone. Alternatively, the indicator 28 may utilize the speakers of the radio system (not shown) to generate the tone or audible alarm.

The control unit 26 is operatively connected between the receiver 16, the parameter definer 24, and the indicator 28. The control unit 26 includes at least one vehicle data input port 32. The first vehicle data input port 32 receives data from a sensor 34 to change the spatial parameters 26 by the parameter definer 24 based on the data received at the first vehicle data input port 32 by a sensor 34. More specifically, the control unit 26 determines, based on the data received from the sensor 34 through the first vehicle data input port 32, how the spatial parameters 26 are to be defined by the parameter definer 24. The parameter definer 24, in turn, operates the receiver 16 such that the radar signals 22 received by the receiver 16 are not registered beyond the necessary limits determined to be necessary by the control unit 26.

The control unit 26 includes an object locator 36. The object locator 36 compares the location signal 18 it receives from the receiver 16 with a threshold signal (not shown).

The control unit 26 also includes a second vehicle data input port 38 for receiving a second input signal from a second sensor 40. The control unit 26 uses the inputs from the first sensor 34 and the second sensor 40 to modify the spatial parameters 27 set forth by the parameter definer 24. In one embodiment, the first sensor 34 senses in which state the transmission is operating, i.e., park, reverse, neutral, and the second sensor 40 senses the speed of the automotive vehicle 14.

The control unit 26 further includes an event recorder 42. The event recorder 42 documents each event defined by the location signal 18 exceeding the threshold signal.

Figure 2:
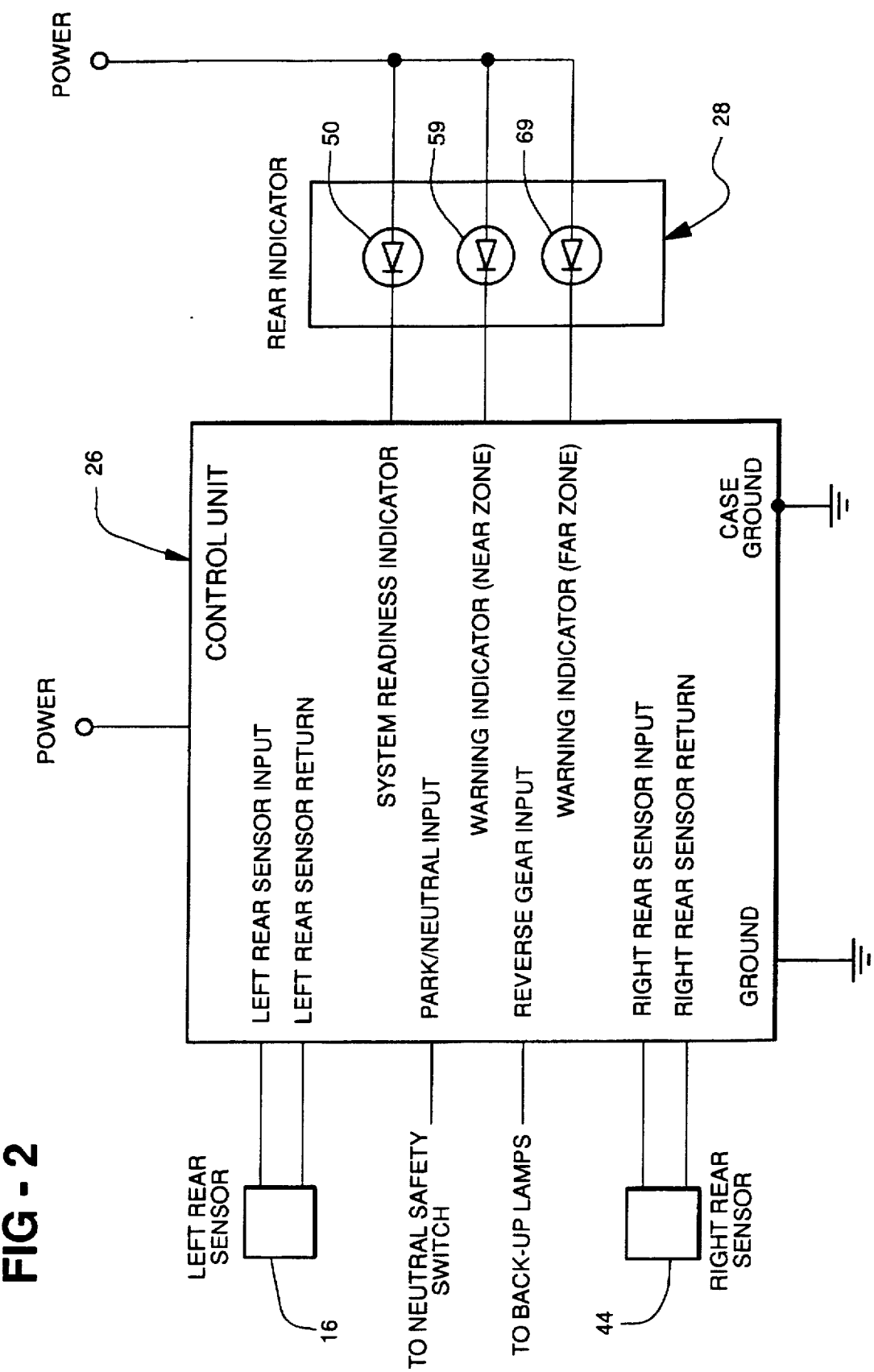
FIG. 2 is a block diagram of the electronics of the embodiment of the invention.

Referring to FIG. 2, the object detection assembly 10 is shown to have a second receiver 44 for receiving the location signal 18 identifying the location of the object 12. The second receiver 44 may be used, as shown in FIG. 2, in the same direction as the first receiver 16. Or, in the alternative, the second receiver 44 may be used in a direction other than that direction in which the first receiver 16 is directed.

Figure 4:
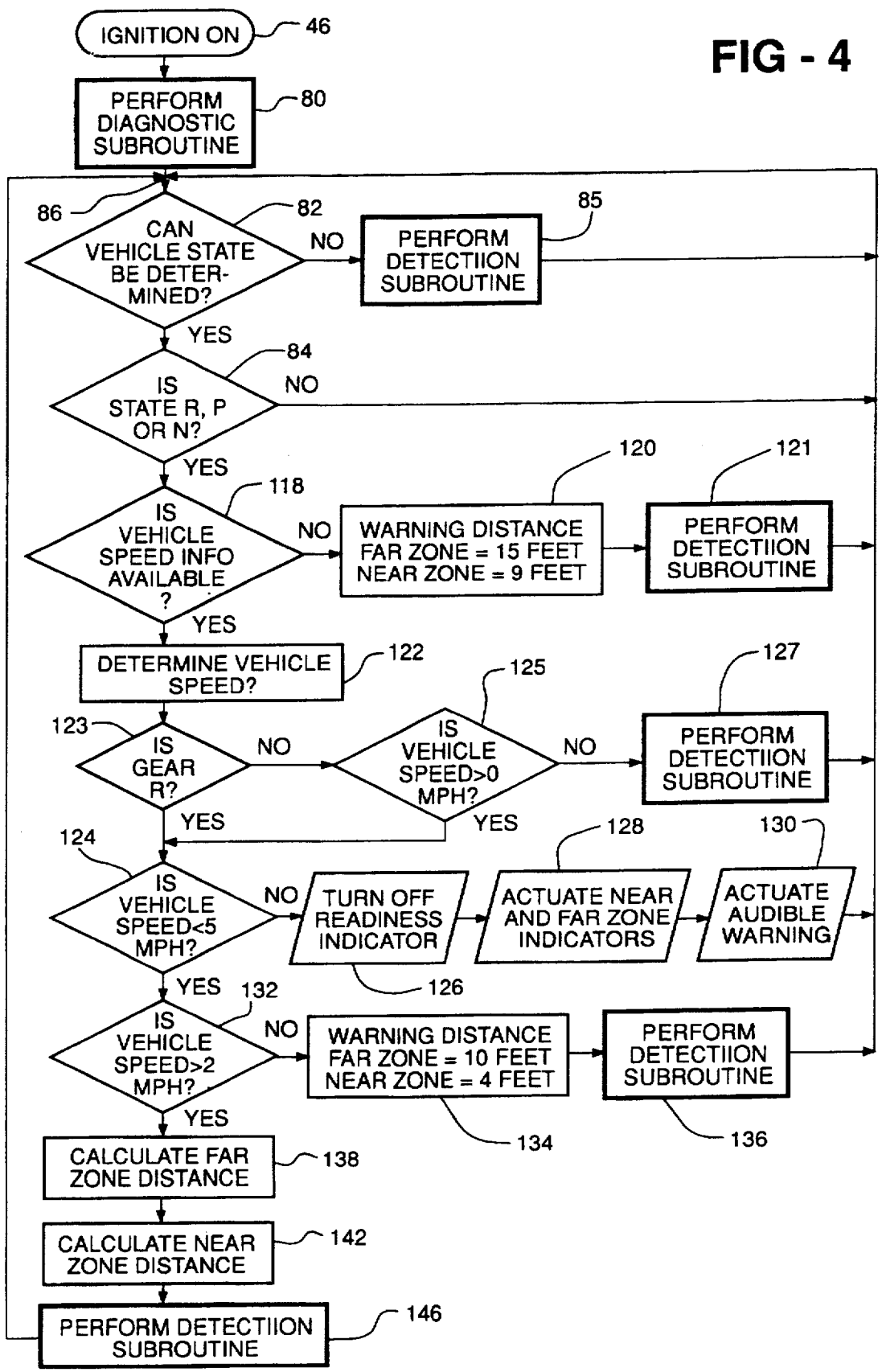
FIG. 4 is a flow-chart of the method operating the object direction assembly.
Figure 5:
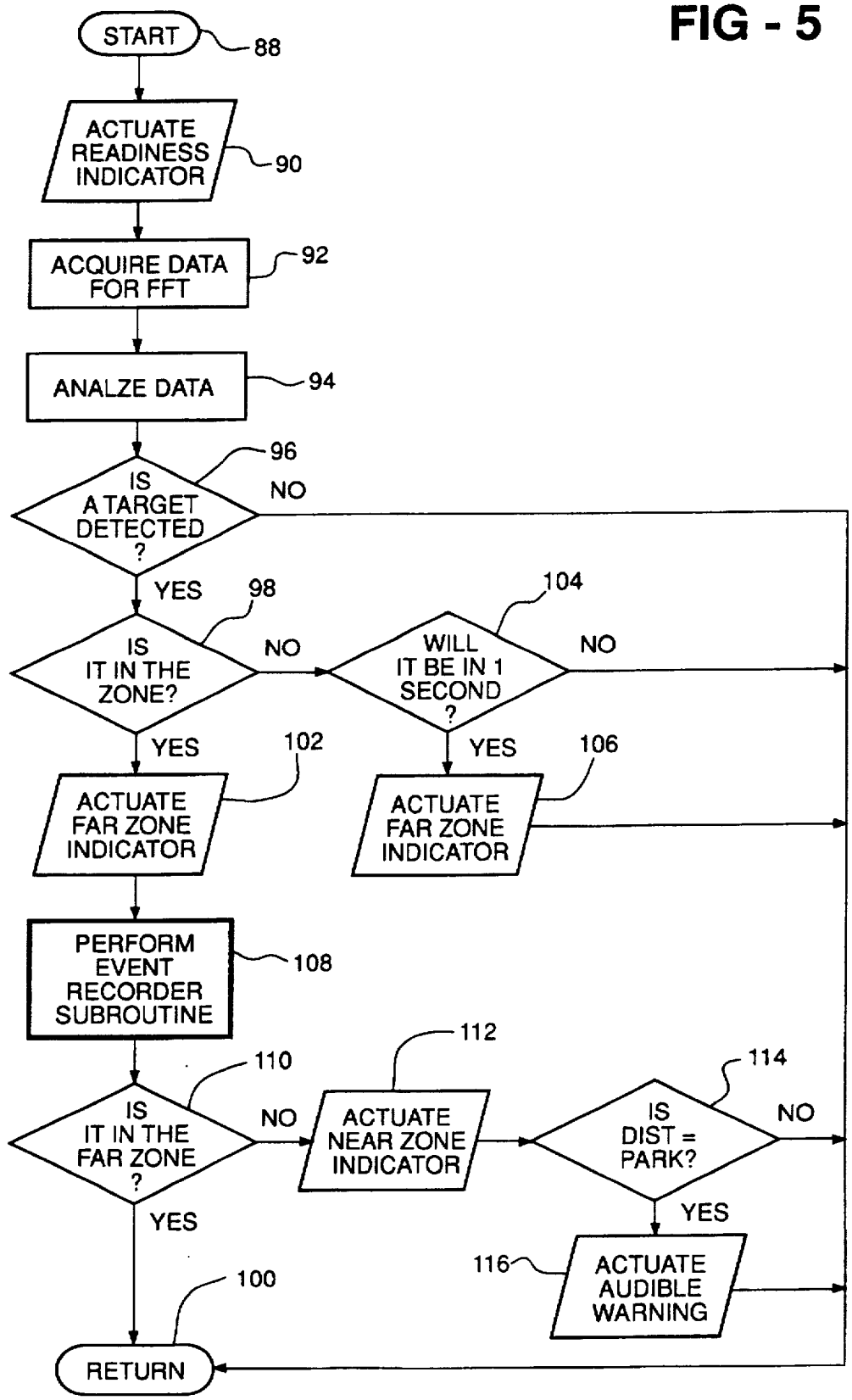
FIG. 5 is a flow-chart of the detection subroutine.
Figure 6:
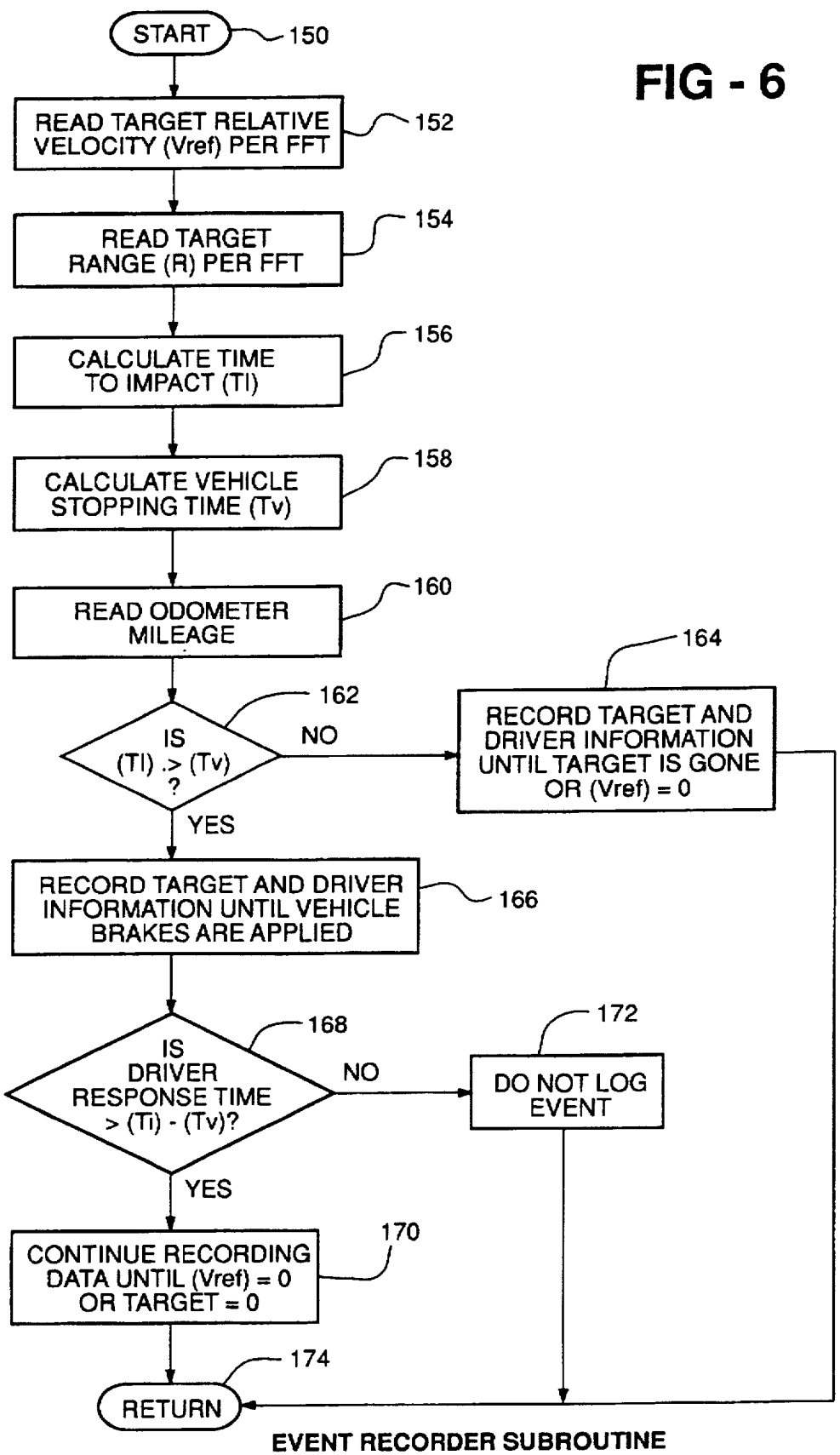
FIG. 6 is the event recorder subroutine.

Turning to FIGS. 4 through 6, flow-charts of the method for detecting an object 12 relative to an automotive vehicle 14 are shown, wherein FIGS. 5 and 6 are subroutines of the method shown in FIG. 4. The method begins when the ignition is turned on at 46. Immediately following, a diagnostics subroutine is performed to determine all of the subsystems of the object detector 10 are operating correctly.

Once the diagnostics subroutine has been performed, at 80, a test is performed to determine whether the vehicle gear can be determined at 82. If so, the gear is tested at 84.

If not, a detection subroutine is performed at 85. Turning to FIG. 5, the detection subroutine begins at 88. The readiness indicator 50 is actuated at 90. Data is received by the receivers 16, 44 at 92. This data is received so that it can determine whether an object 12 can be detected and thus located. This data will be tested by comparing the data, in signal form, against a threshold signal. It may be appreciated by those skilled in the art that this subroutine may be interrupted at any time based on the inputs received by the first 34 and second 40 sensors.

In the preferred embodiment, the threshold test uses collected data to create a signal using a fast Fourier transform, at 94. The fast Fourier transform (FFT) transforms the signal, a function of time, into a second signal as a function of frequency. It will be apparent to those skilled in the art that transforms other than the FFT may be used, in particular when using other types of signals.

Once the radar signal is transformed using the FFT, it is determined whether a target has been detected at 96. A determination is made when the FFT signal exceeds the threshold signal. If a target is detected, it is determined whether the target is in the zone at 98. If a target is not detected, the subroutine is ended and the program returns to the routine at 100.

If the target has been detected and it is in the zone, the far zone indicator is actuated at 102. If, however, the target is not in the zone, it is determined whether, based on the speed of the automotive vehicle 14 and the location of the target or object 12 whether the object 12 will be in the zone in one second, at 104. If not, the program is returned at 100. If so, the far zone indicator is actuated at 106.

If the far zone indicator was actuated at 102, the event recorder subroutine is performed at 108. A detailed discussion of the event recorder subroutine will be discussed subsequently. Once the event recorder subroutine has been performed, it is determined whether the object 12 is in the far zone at 110. If so, the program is returned at 100. If not, the near zone indicator is actuated at 112. The control unit 26 must then determine if the distance to the object 12 is equal to a preset parking distance at 114. If so, an audible warning is actuated at 116. If not, the subroutine is returned at 100.

Returning to FIG. 4, the state of the vehicle transmission is determined at 84. If the state of the vehicle transmission is not in reverse, park, or neutral, the method is returned to point 86 and the state of the vehicle transmission is tested again to be determined in which state the vehicle transmission is.

If, however, the vehicle transmission is in a state of reverse, park, or neutral, it is determined if vehicle speed information is available, at 18. If not, the spatial parameters 27 used for detection are defined at default values, fifteen (15) feet for the far zone and nine (9) feet for the near zone at 120. The detection subroutine is performed at 121. The method is then looped back to point 86 where it is determined in which state the transmission is operating. If the vehicle speed information is available, the vehicle speed is determined, at 122. If the vehicle speed is determined, it is then determined, at 123, whether the transmission is in the reverse state. If so, it is determined if the vehicle speed is less than five miles per hour, at 124. If not, it is determined whether the vehicle speed is positive, at 125. If so, the method returns to diamond 124 where it is determined whether the vehicle speed is less than five miles per hour. If the vehicle speed is not positive and the transmission state is other than reverse, the detection subroutine is performed, at 127. The detection subroutine is performed, at 146. If the vehicle speed is not less than five (5) miles per hour, the readiness indicator 50 is turned off, at 126. The near and far zone indicators 59, 69 are actuated, at 128, and the audible warning is actuated at 130. The actuation of these indicators and the audible warning will continue until the vehicle speed is less than five (5) miles per hour or if the transmission state is something other than reverse, park or neutral. If the vehicle speed is determined to be less than (5) miles per hour it is determined whether the vehicle speed is greater than two (2) miles per hour, at 132. If the vehicle speed is not greater than two (2) miles per hour the spatial parameters 27 for the far zone are defaulted to ten (10) feet and the near zone are defaulted to four (4) feet, at 34. At this point the detection subroutine is performed, at 136. The detection subroutine has been discussed above and is illustrated in FIG. 5.

If the vehicle speed is greater than two (2) miles per hour (but less than five (5) miles per hour) the far zone distance is calculated, at 138. The spatial parameters 27 used for detection for the far zone are that the distance for the far zone from the rear fascia 140 of the automotive vehicle 14 is calculated using the following equation:

$$D_{far}=1.5*(V_{speed}-2)+10.$$

Once the far zone distance is calculated, the near zone distance is calculated, at 142. The near zone distance is calculated using the following equation:

$$D_{near}=1.5*(V_{speed}-2)+4.$$

The detection subroutine is performed, at 146 and the method is looped back to point 86 where it is determined in which state the transmission is operating, at 82.

Referring to FIG. 6, the event recorder subroutine is shown. The event recorder subroutine is started, at 150. The relative velocity is the vector addition of the velocities of the automotive vehicle 14 and the object 12. The relative velocity is read based on the FFT, at 152. The range (R) of the target 12 is also read per the FFT, at 154. The time in which the automotive vehicle 14 will impact the target 12 is calculated, at 156. The time to impact ($T_i$) is calculated by the following equation:

$$T_i=R \div \text{relative velocity}.$$

The vehicle stopping time $T_v$ is calculated using a range rate equation system or any similar system, at 158. The odometer mileage is read, at 160.

It is then determined, at 162, whether the time to impact $T_i$ is greater than vehicle stopping time $T_v$. If not, the object 12 and driver information are recorded until the object 12 is no longer detected or until the relative velocity of the object 12 equals zero. This recording is performed at 164. If, however, the time to impact $T_i$ is greater than the vehicle stopping time $T_v$, the target and driver information are recorded until the vehicle brakes are applied, at 166. If the driver response time is greater than the time to impact $T_i$ minus the vehicle stopping time $T_v$, tested at 168, the recording of the data continues until the relative velocity equals zero or until the target is no longer detected, at 170. If the drivers response time is less than the time to impact $T_i$ minus the vehicle stopping time $T_v$, the event is not logged, at 172, and the subroutine is ended and returned, at 174.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims the invention may be practiced otherwise than as specifically described.

What is claimed is:

1. An object detection system for indicating to a vehicle operator the presence of an object within an area of interest comprising:

a speed sensor for generating a signal indicative of the speed at which the vehicle is traveling;

a transmission gear sensor for generating a signal indicative of the gear in which the vehicle is being operated;

a control unit operatively coupled to said speed sensor and said gear sensor, said control unit including a parameter definer for adaptively defining a set of spatial parameters based on said speed sensor signal in combination with said gear sensor signal, said spatial parameters including parameters which define said area of interest;

a receiver operatively coupled to said control unit for receiving a signal indicative of the presence of an object within said area of interest, said control unit generating an output signal in response to a received signal indicating the presence of an object within said area of interest; and an indicator for providing at least two discernable indications to an operator of the vehicle in response to receipt of said control unit output signal, said indications being varied with the speed at which said vehicle is traveling.

2. The system of claim 1 wherein said set of spatial parameters define at least two zones within said area of interest, said zones including a near zone generally adjacent said vehicle and a far zone generally outside said near zone.

3. The system of claim 2 wherein said control unit output signal includes indication of whether an object is in said near zone or said far zone, and wherein said indicator provides discernable indications in each case.

4. The system of claim 1 wherein said transmitted and received signals are radar signals.

5. The system of claim 1 wherein said control unit outputs said output signal to said indicator if an object will be within said area of interest within a predetermined period of time.

\* \* \* \* \*